Aug. 4, 1970    A. E. CHROW    3,522,413

COMPOSITE ELECTRICALLY HEATED TUBING PRODUCT

Original Filed July 1, 1964

INVENTOR

ALBERT E. CHROW

BY Teare, Teare & Sammon

ATTORNEYS

United States Patent Office 3,522,413
Patented Aug. 4, 1970

3,522,413
COMPOSITE ELECTRICALLY HEATED
TUBING PRODUCT
Albert E. Chrow, Chagrin Falls, Ohio, assignor to Samuel Moore and Company, Mantua, Ohio, a corporation of Ohio
Original application July 1, 1964, Ser. No. 379,638, now Patent No. 3,355,572, dated Nov. 28, 1967. Divided and this application Oct. 2, 1967, Ser. No. 672,377
Int. Cl. H05b 3/58
U.S. Cl. 219—301          10 Claims

ABSTRACT OF THE DISCLOSURE

A composite tubing for sampling fluids includes a generally flexible metallic sampling line having a plurality of electrical heating wires held in heat exchange relationship to the peripheral surface thereof by means of a polymeric binder strand. A tubular thermo-barrier of expanded plastic foam material encompasses the sampling line and heating wires. Alternatively, the thermobarrier may comprise a layer of fibrous filler material wrapped over with a layer of polymeric tape. The thermo-barrier is made fluid impervious by a flexible polymeric layer. A flexible corrugated metallic cover is disposed over the polymeric layer and a flexible polymeric sheath covers and protects the metallic cover.

CROSS REFERENCES TO RELATED APPLICATIONS

This application is a division of my copending application Ser. No. 379,638, filed July 1, 1964, now Pat. No. 3,355,572, granted Nov. 28, 1967.

BACKGROUND OF THE INVENTION

This invention relates in general to composite tubing, and more particularly to a composite tubing construction which is adapted for use in conveying a fluid, either liquid or gas, from one point to another, while maintaining the temperature of the conveyed fluid substantially constant throughout the length of the tubing.

This type of tubing presently finds its principal use in the chemical processing and petroleum refining industries, and is used, for example, for conveying a sample of fluid from a process line or a reaction vessel to an automatic instrument, such as a continuous sampling instrument, for example a chromatograph or infra-red spectograph. Samples of the fluid taken under these conditions generally should be maintained at a relatively elevated temperature because the viscosity of the fluid must be kept as low as possible. Moreover, in the case of a gas sample being transmitted, the gaseous sample must not be permitted to condense.

In the past, such sampling tubing usually has been custom made for a particular installation, but such tubing has not been uniform in construction and operating characteristics, and has not been completely satisfactory.

SUMMARY OF THE INVENTION

The present invention provides a composite tubing or sampling line bundle which may be mass produced, which may be readily installed, which is of uniform construction from one end thereof to the other end and will therefore provide uniform and accurate results from the use of the tubing. The invention also provides a tubing or sampling line bundle which is economical to use and which provides for precise control, within a relatively narrow range, of the temperature of the fluid flowing through the tubing.

Accordingly, an object of the invention is to provide a novel composite tubing product.

Another object of the present invention is to provide a composite tubing which is adapted for use as sampling tubing, and which is relatively easy to bend to the desired configuration for extending from the point of sampling to instrumentation, for handling the samples taken by the tubing, and wherein the tubing is of a uniform construction throughout its length, for providing consistent and accurate results from the sample taken.

Another object of the invention is to provide a novel composite tubing for sampling fluids comprising a sampling line with electrical heating means disposed in juxtaposed relation with the sampling line, and with a cellular plastic thermobarrier encompassing the line and electrical heating means, and a flexible sheath of plastic material encompassing the thermobarrier and the sampling line.

A more specific object of the invention is to provide a novel composite tubing for sampling fluids comprising, a generally linearly extending bendable sampling line, a plurality of solid electrical heating wires disposed in intimate engagement with the sampling line, and entwining thereabout in slow spirals, a slit tubular thermobarrier of a cured expanded plastic foam material, such as polyurethane foam, encompassing said sampling line and associated heating wires and an outer sheath of polymeric plastic (e.g. polyvinyl chloride plastic) covering the foam tube.

Another specific object of the invention is to provide a novel composite tubing for sampling fluids comprising, a generally linearly extending bendable sampling line, a plurality of solid electrical heating wires disposed in intimate engagement with the sampling line, and entwining thereabout in slow spirals, a layer of flexible fibrous filler and insulating material encompassing the sampling line and heating wires to give a symmetrical configuration to the bundle, a thermobarrier layer of flexible insulating tape wound about said filler material in overlapping relation, a flexible metallic protective cover layer encompassing the taped bundle with a layer of flexible polymeric plastic disposed between the metallic cover and the insulating tape, and an outer sheath of flexible polymeric plastic covering the metallic protective cover.

Other objects and advantages of the invention will be apparent from the following description taken in conjunction with the accompanying drawings.

DESCRIPTION OF THE PREFERRED EMBODIMENTS

Figure 1:
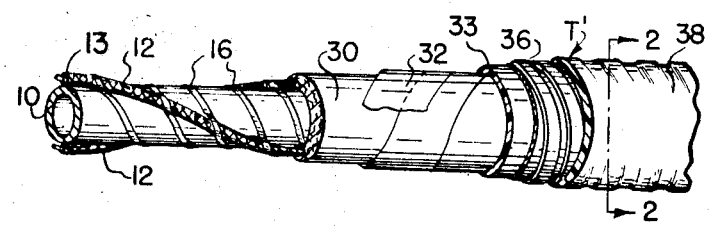
FIG. 1 is a partially cut-away fragmentary view of a composite tubing of the invention including a flexible armor layer.

Referring again to the drawings, there is shown a piece of composite tubing T' comprising a sampling or control line or tube 10 with electrical heating means or electrical heating wires 12 wrapped in spiral fashion about the sampling line 10 and in intimate contact therewith.

The sampling line 10 may be formed, for instance, of metallic material such as stainless steel, with the line having a wall thickness of for instance .035 inch. The heating wires 12 are of conventional type and for instance, a nickel-chromium wire insulated with a polymeric tape covered with a single fiberglass braid 13. The polymeric insulating tape on the electrical wires may be of the known thermoplastic material polytetrofluorethylene (commonly known as Teflon). The fiberglass braid on the electrical wires gives added mechanical protection to the wires.

The wires 12 are wound in a slow spiral about the sample tube 10 and are maintained in diametrically opposite condition with respect to the longitudinal axis of the tubing 10. In order to insure the maintenance of the two electrical heating elements in said diametrically opposed condition, the wires are preferably wrapped with binder strands 16. Binder strands 16 may be comprised of one continuous strand of nylon fiber or the like wrapped in spiral relation about tube 10 and associated wires 12.

Surrounding the sampling tube and associated electrical heating wires there may be provided a layer 30 of filler material which may be formed of fibrous material, such as for instance jute, or other filamentary material, and which may be of a heat insulating character. This filler material provides a generally symmetrical configuration to the bundle and also provides a cushion for the bundle.

Wrapped about the layer of filler material 30 is a wrap of polymeric film tape 32, with the tape wound about the filler material with about a 25% overlap in the embodiment illustrated. An excellent material for the tape is found to be "Mylar" from the E. I. Du Pont de Nemours and Company, which material is a polyethylene teraphthalate polyester film of tough, strong characteristics, and which is impervious to moisture. Such polyester is of very high molecular weight (above 10,000) and formed from the reaction of equal moles of ethylene glycol and terephthalic acid. The polymeric tape may be of 1 mil. thickness. The tape is preferably wrapped sufficiently about the filler layer 30 to provide a nominal buildup of approximately 3/16 inch thickness of filler and tape. The tape may be of an asbestos-polyester laminate. Thus, the aforementioned "Mylar" may be laminated with asbestos in a known manner to provide such insulating tape. Covering the taped layer is a layer 33 of preferably extruded flexible plastic, such a the aforementioned polyvinyl chloride, which provides a protective and moisture resistant barrier for the taped bundle.

Covering such plastic encompassed bundle is a flexible metallic protective layer 36, such as BX armor or tape, to give a high strength, crush resistant armored tubing. A flexible sheath 38 of flexible plastic is then preferably extruded over the flexible armored layer 36. Sheath 38 acts to give corrosion and moisture resistance to the armored layer. Tape layer 32 also prevents any electrogalvanic action between the sampling line and the metallic armor 36. Moreover, the armor layer 36 materially increases the "pull" and "crush" resistance of the composite tubing, with the plastic sheath 38 mechanically interlocking with the interstices or corrugations in the armor layer 36. This outer jacket 38 may be formed of any suitable plastic material, such as for instance the polyvinyl chlorides, polyethylenes, polyurethanes, neoprenes, or fluoro carbons (e.g. Teflon).

Figure 2:
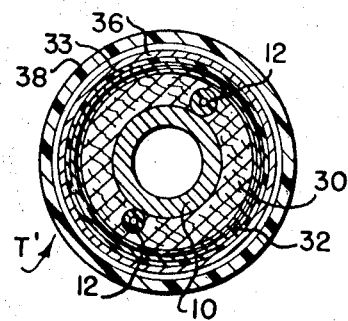
FIG. 2 is an enlarged transverse cross-sectional view taken generally along the plane of line 2—2 of FIG. 1, looking in the direction of the arrows.
Figure 3:
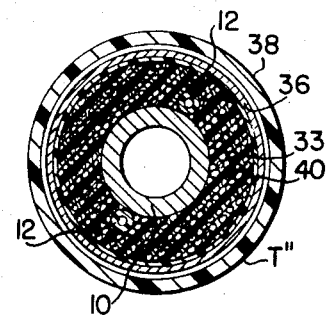
FIG. 3 is an enlarged transverse cross-sectional view of a further embodiment of tubing including a flexible armor layer.

Referring now to FIG. 3, there is illustrated a further embodiment of tubing bundle T" including a flexible armor layer 36, but which uses a thermobarrier layer 40 of flexible cellular plastic material, such as polyurethane foam, instead of the filler layer 30 and tape layer 32 of the FIGS. 1 and 2 embodiment. In other respects, the FIG. 3 bundle is generally similar to that of FIGS. 1 and 2. The foam layer 40 is preferably preformed into a tubular configuration having an aperture running therethrough for receiving therein the sampling line and associated heating means. The tubular foam may be preferably slit along one side thereof (not shown) as described in applicant's copending application, Ser. No. 379,638, now Pat. No. 3,355,572 to enable ready entry of the sampling line and heating line into encompassed relation with respect to the foam layer. While a preformed cellular foam layer is preferred, such layer could be made "foaming-in-place" during continuous manufacture of the product. The wall thickness of the foam thermobarrier layer is preferably approximately 1/4 inch.

While the sampling lines have been referred to as metallic, it will be understood that such lines might be of nonmetallic materials and formed, for instance, of "Teflon" or nylon.

The composite tubing of the invention enjoys reduced cost of installation as compared to custom made structures heretofore used, and is of considerably less bulk adn weight per foot as compared to such prior art installations. The tubing because of its uniformity and reliability in operation gives much more uniform and accurate results from fluid samples taken thereby.

The product is capable with the 14 A.W.G.-solid heating wire, of giving approximately 9.25 watts per foot in ambient temperature ranges between approximately $-20°$ F. and $100°$ F., and is capable of maintaining a temperature differential of up to about $200°$ F. Generally, the wattages can be increased for lower ambient temperatures. However, it has been found that the ambient temperature should be as low as possible within said range for higher wattages, since there is a definite maximum ambient temperature limitation on the wattages per foot for different sizes of heating wire and various wattage ranges. The reason for ambient temperature limitations is that it is not desirable to expose the polyurethane foam thermobarrier layer 40 to temperatures higher than about $300°$ F. The electrical heating means, however, gives precise control over the temperatures maintained at the sampling tube.

From the foregoing description and accompanying drawings it will be seen that the invention provides a novel composite tubing comprising, a sampling line having electrical heating means disposed thereabout in generally spiral relation and about which is provided an insulating layer of flexible cellular plastic material or insulating tape material, which in turn is jacketed with an outer flexible plastic sheath, which may include flexible armor, for protecting the tubing, and wherein the tubing may be readily installed and handled in a much more expeditious, convenient and inexpensive manner as compared to custom made arrangements.

The term and expressions which have been used are used as terms of description and not of limitation, and there is no intention in the use of such terms and expressions, of excluding any equivalents of any of the features shown or described, or portions thereof, and it is recognized that various modifications are possible within the scope of the invention claimed.

I claim:
1. A deformable composite tubing product of uniform construction throughout its length of the type for use as a sampling tubing comprising,
   a flexible, heat conductive sampling line having a passageway for transmitting a fluid therethrough,
   at least two electrical heating lines helically disposed in heat transfer relation around said sampling line, said lines being in generally symmetrically disposed relationship with respect to the peripheral surface of said sampling line,
   each of said heating lines comprising a wire having a non-metallic flexible cover thereon,
   a continuous, flexible polymeric strand wound around said heating lines and said sampling line for maintaining said heating lines in their helical engaged heat transfer relation with said sampling line,
   a lightweight, thermo-barrier layer of heat insulating material disposed in encompassing relation around said sampling and heating lines and said strand along their length thereof,
   said thermo-barrier layer comprised of a flexible, cellu- lar polymeric foam material providing an insulating construction therefor, a flexible polymeric layer disposed in encompassing relation around said thermo-barrier layer so as to provide a fluid impervious barrier around said thermo-barrier layer, a flexible, corrugated metallic cover disposed around said polymeric barrier layer throughout its length thereof, a flexible sheath of polymeric material disposed over said metallic cover and in encompassing relation around said metallic cover, and the wall thickness of said sheath being relatively thin as compared to the wall thickness of said thermo-barrier layer of foam material.

2. A composite tubing product in accordance with claim 1 wherein
said sampling line is comprised of stainless steel, and wherein
said metallic cover is comprised of steel armor.

3. A composite tubing product in accordance with claim 1 wherein
said thermo-barrier layer is comprised of a pre-formed tubular foam material having a passageway extending therethrough adapted for receipt of said sampling and electrical heating lines therein,
said tubular foam material having a slit along one side thereof to enable placement thereof around said sampling and heating lines.

4. A composite tubing product in accordance with claim 1, wherein
said thermo-barrier layer comprises a polyurethane foam material.

5. A composite tubing product in accordance with claim 1, wherein
said non-metallic cover includes a polymeric insulating tape.

6. A composite tubing product in accordance with claim 5, wherein
said insulating tape is covered with a fiberglass braid.

7. A composite tubing product in accordance with claim 1, wherein
said polymeric strand is wrapped in spiral relation around said heating lines.

8. A composite tubing product in accordance with claim 7, wherein
said strand is comprised of nylon.

9. A composite tubing product in accordance with claim 1, wherein
said outer sheath has been extruded over said metallic cover so as to be in mechanical interlocking relation with the corrugations of said cover.

10. A composite tubing in accordance with claim 1, wherein
said thermo-barrier layer comprises a flexible cellular polyurethane foam material disposed around said sampling and heating lines and said strands so as to provide a cushion-like construction for said metallic cover.

References Cited

UNITED STATES PATENTS

| | | |
|---|---|---|
| 1,995,302 | 3/1935 | Goldstein. |
| 2,168,067 | 8/1939 | Jones _____ 138—134 |
| 2,578,280 | 12/1951 | Barnard. |
| 2,829,671 | 4/1958 | Ernst _____ 138—138 X |
| 2,936,792 | 5/1960 | MacCracken et al. |
| 3,097,288 | 7/1963 | Dunlap _____ 219—528 X |
| 3,151,633 | 10/1964 | Shuman. |
| 3,269,422 | 8/1966 | Matthews et al. |
| 2,243,220 | 5/1941 | Pitman _____ 219—301 X |

FOREIGN PATENTS

| | | |
|---|---|---|
| 527,759 | 10/1940 | Great Britain. |
| 857,534 | 12/1960 | Great Britain. |

ANTHONY BARTIS, Primary Examiner

U.S. Cl. X.R.

137—341; 138—33, 146; 219—522, 535, 548; 222—146